United States Patent
Cheng et al.

(10) Patent No.: US 11,170,194 B2
(45) Date of Patent: Nov. 9, 2021

(54) CONTROL CIRCUIT AND RELATED METHOD FOR CONTROLLING DISPLAY PANEL

(71) Applicant: NOVATEK Microelectronics Corp., Hsin-Chu (TW)

(72) Inventors: Huan-Teng Cheng, Hsinchu (TW); Wei-Lun Shih, Hsinchu (TW); Huang-Chin Tang, Hsinchu County (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 0 days.

(21) Appl. No.: 16/865,404

(22) Filed: May 3, 2020

(65) Prior Publication Data
US 2021/0056280 A1   Feb. 25, 2021

Related U.S. Application Data

(60) Provisional application No. 62/890,052, filed on Aug. 21, 2019.

(51) Int. Cl.
*G06K 9/00* (2006.01)
*G09G 3/34* (2006.01)
(Continued)

(52) U.S. Cl.
CPC ......... *G06K 9/0004* (2013.01); *G06F 1/3262* (2013.01); *G06F 3/0412* (2013.01);
(Continued)

(58) Field of Classification Search
USPC ........................................................ 345/173
See application file for complete search history.

(56) References Cited

U.S. PATENT DOCUMENTS

| | | | | |
|---|---|---|---|---|
| 2014/0101737 A1* | 4/2014 | Rhee | ................... | H04L 63/0861 726/6 |
| 2015/0109237 A1* | 4/2015 | Liang | .................. | G06F 3/04886 345/174 |

(Continued)

FOREIGN PATENT DOCUMENTS

| | | |
|---|---|---|
| CN | 104798311 A | 7/2015 |
| CN | 106203026 A | 12/2016 |

(Continued)

OTHER PUBLICATIONS

Cheng, the specification, including the claims, and drawings in the U.S. Appl. No. 16/851,043, filed Apr. 16, 2020.

*Primary Examiner* — Chineyere D Wills-Burns
(74) *Attorney, Agent, or Firm* — Winston Hsu

(57) ABSTRACT

A control circuit configured to control a display panel under normal display includes a display driver circuit, a touch sensing circuit and a fingerprint sensing circuit. The touch sensing circuit, coupled to the display driver circuit, is configured to detect a predetermined touch gesture on the display panel and determine a position of the display panel on which the predetermined touch gesture is detected. The fingerprint sensing circuit, coupled to the touch sensing circuit, is configured to perform fingerprint sensing on at least one zone corresponding to the position when the predetermined touch gesture is detected, in order to perform a specific function.

14 Claims, 10 Drawing Sheets

(51) Int. Cl.
  *G06F 1/3234* (2019.01)
  *G06F 3/041* (2006.01)
  *G06F 3/0481* (2013.01)
  *G09G 5/10* (2006.01)
  *G06K 9/20* (2006.01)
  *G06F 3/0488* (2013.01)
  *G09G 3/20* (2006.01)

(52) U.S. Cl.
  CPC .......... *G06F 3/0416* (2013.01); *G06F 3/0488* (2013.01); *G06F 3/04186* (2019.05); *G06F 3/04817* (2013.01); *G06K 9/00912* (2013.01); *G06K 9/2027* (2013.01); *G09G 3/3406* (2013.01); *G09G 5/10* (2013.01); *G06F 2203/04105* (2013.01); *G09G 2354/00* (2013.01)

(56) References Cited

U.S. PATENT DOCUMENTS

| | | | |
|---|---|---|---|
| 2015/0135108 A1* | 5/2015 | Pope | G06F 3/0484 715/767 |
| 2016/0110056 A1* | 4/2016 | Hong | G06F 3/04883 715/768 |
| 2016/0371691 A1* | 12/2016 | Kang | G06K 9/00013 |
| 2017/0124372 A1* | 5/2017 | Evans, V | G06F 1/1684 |
| 2017/0206395 A1* | 7/2017 | Chang | G06K 9/0004 |
| 2017/0351850 A1* | 12/2017 | Jin | H04W 12/068 |
| 2018/0101715 A1 | 4/2018 | Lee | |
| 2018/0224999 A1 | 8/2018 | Lee | |
| 2018/0329560 A1* | 11/2018 | Kim | G06F 3/0487 |
| 2018/0348949 A1* | 12/2018 | Kim | G06K 9/0002 |
| 2018/0349669 A1* | 12/2018 | Kim | G06K 9/22 |
| 2018/0373361 A1* | 12/2018 | Her | G06F 3/04184 |
| 2019/0065808 A1 | 2/2019 | Zhang | |
| 2020/0092411 A1* | 3/2020 | Xu | G06F 3/04883 |

FOREIGN PATENT DOCUMENTS

| | | |
|---|---|---|
| CN | 107402663 A | 11/2017 |
| CN | 109409070 A | 3/2019 |
| CN | 109885998 A | 6/2019 |
| EP | 3 401 772 A1 | 11/2018 |
| TW | 201145107 A1 | 12/2011 |
| TW | 201839650 A | 11/2018 |
| TW | 201839659 A | 11/2018 |
| TW | 201842467 A | 12/2018 |
| TW | 1662452 B | 6/2019 |

* cited by examiner

FIG. 5

CONTROL CIRCUIT AND RELATED METHOD FOR CONTROLLING DISPLAY PANEL

CROSS REFERENCE TO RELATED APPLICATIONS

This application claims the benefit of U.S. Provisional Application No. 62/890,052, filed on Aug. 21, 2019, the contents of which are incorporated herein by reference.

BACKGROUND OF THE INVENTION

1. Field of the Invention

The present invention relates to a control circuit and a related method for controlling a display panel, and more particularly, to a control circuit capable of controlling a display panel to trigger a specific function based on fingerprint sensing.

2. Description of the Prior Art

Fingerprint recognition technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user only needs to put his/her finger on a fingerprint sensing pad or area to login the electronic device instead of entering long and tedious username and password.

Conventionally, if a user of a smart phone wants to open an application, the user may touch the icon corresponding to the application on the user interface of a touch panel. If the application is locked and thus requires fingerprint recognition to unlock it, the unlocking operation may be more complex with combination of the fingerprint recognition function and touch sensing operation. For example, the fingerprint control circuit should communicate with the system processor for determination and comparison of the fingerprint's features, and the user should move his/her finger to a designated position on the display panel, allowing the fingerprint sensing signals to be read out. The redundant operations and time consumption decrease the sensing speed and thus reduce the user experience of fingerprint recognition.

In general, the display panel may have a screen disposed with touch sensor and fingerprint sensor, to be capable of receiving touch signals and fingerprint signals. A control circuit may be applied to control the display driving, touch sensing, and fingerprint sensing functions on the display panel. FIG. 1 illustrates a common operation of opening an application based on fingerprint recognition. In general, if a finger touch on the icon of the application is detected, the touch sensing circuit of the control circuit may inform a system processor of the information of finger touch. In response, the system processor controls the screen to display the fingerprint sensing indication to show an icon indicating a designated position to receive the fingerprint image. Subsequently, the user may move the finger to the designated position, and the fingerprint sensing circuit of the control circuit may start to receive the fingerprint image signals and forward the corresponding image data to the system processor. Therefore, the system processor may compare the features of the received fingerprint image with previously stored fingerprint data to determine whether they are matching, in order to determine whether to open the application.

In the operation of opening the application with fingerprint recognition, the fingerprint image signals and related display data should be sent back and forth between the control circuit and the system processor, and thus larger time consumption is necessary for the communications. Also, the user has to move his/her finger to the designated position indicated by the system. The additional action and time reduce the user experience of fingerprint recognition. Further, since the system processor is required to send an image signal to the screen to show the icon for fingerprint sensing indication, more power consumption is necessary to realize the display function. Thus, there is a need for improvement over the prior art.

SUMMARY OF THE INVENTION

It is therefore an objective of the present invention to provide a control circuit and a related method for controlling a display panel, in order to solve the abovementioned problems.

An embodiment of the present invention discloses a control circuit configured to control a display panel under normal display. The control circuit comprises a display driver circuit, a touch sensing circuit and a fingerprint sensing circuit. The touch sensing circuit, coupled to the display driver circuit, is configured to detect a predetermined touch gesture on the display panel and determine a position of the display panel on which the predetermined touch gesture is detected. The fingerprint sensing circuit, coupled to the touch sensing circuit, is configured to perform fingerprint sensing on at least one zone corresponding to the position when the predetermined touch gesture is detected, in order to perform a specific function.

Another embodiment of the present invention discloses a method of a control circuit for controlling a display panel under normal display. The method comprises the steps of: detecting a predetermined touch gesture on the display panel; determining a position of the display panel on which the predetermined touch gesture is detected; and performing fingerprint sensing on at least one zone corresponding to the position when the predetermined touch gesture is detected, in order to perform a specific function.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram of determining the heavy touch gesture based on the touch strength and/or touch range according to an embodiment of the present invention.

DETAILED DESCRIPTION

In order to improve the convenience of fingerprint recognition, the control circuit and related display panel of the present invention are capable of the in-display fingerprint sensing function; that is, the fingerprint signals may be sensed at any position of the screen. To achieve this purpose, there may be a sensor array disposed in the display panel. The sensor array may be implemented as an array of sensing pixels, each having a photodiode for sensing the light to generate a sensing signal and also having a transistor for forwarding the sensing signal to the control circuit. In such a situation, an optical fingerprint recognition operation may be realized by using the photodiode(s) in the touch region to sense the light reflected from the touch finger.

In general, the control circuit applied to deal with the touch sensing operation and fingerprint sensing operation of a display device having touch and fingerprint sensing functions may be a fingerprint, touch and display integration (FTDI) circuit. In an embodiment, the FTDI circuit may be implemented as an integrated circuit integrated in a single chip. Alternatively, the FTDI circuit may be a combination of multiple chips having control circuits with different functions. To facilitate the illustration, the control circuit will generally be called "FTDI circuit" hereinafter.

Figure 1:
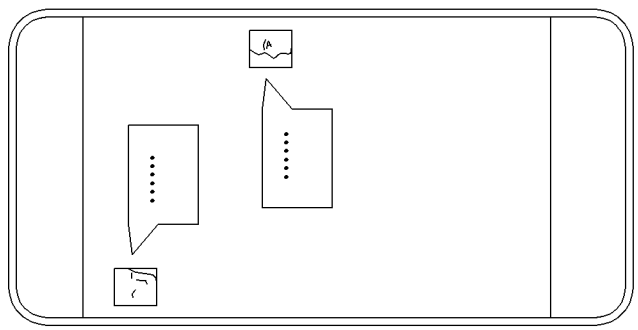
FIG. 1 is a schematic diagram of a common operation of opening an application based on fingerprint recognition.
Figure 1:
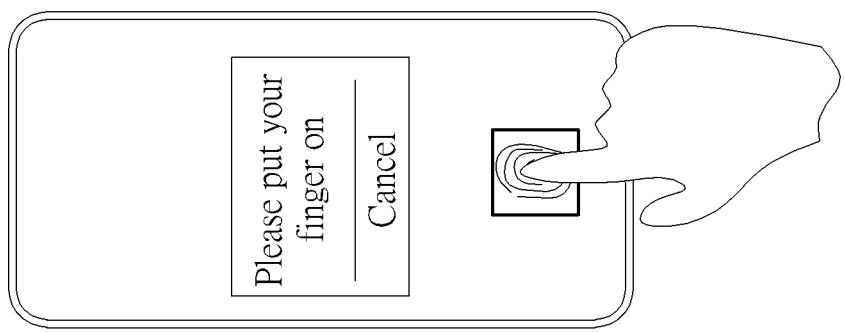
Figure 1:
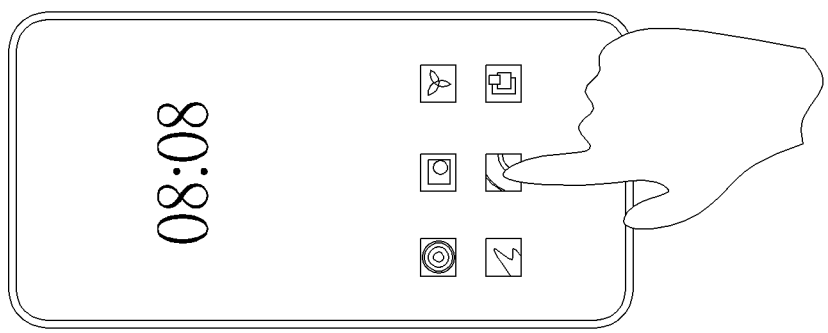
Figure 2:
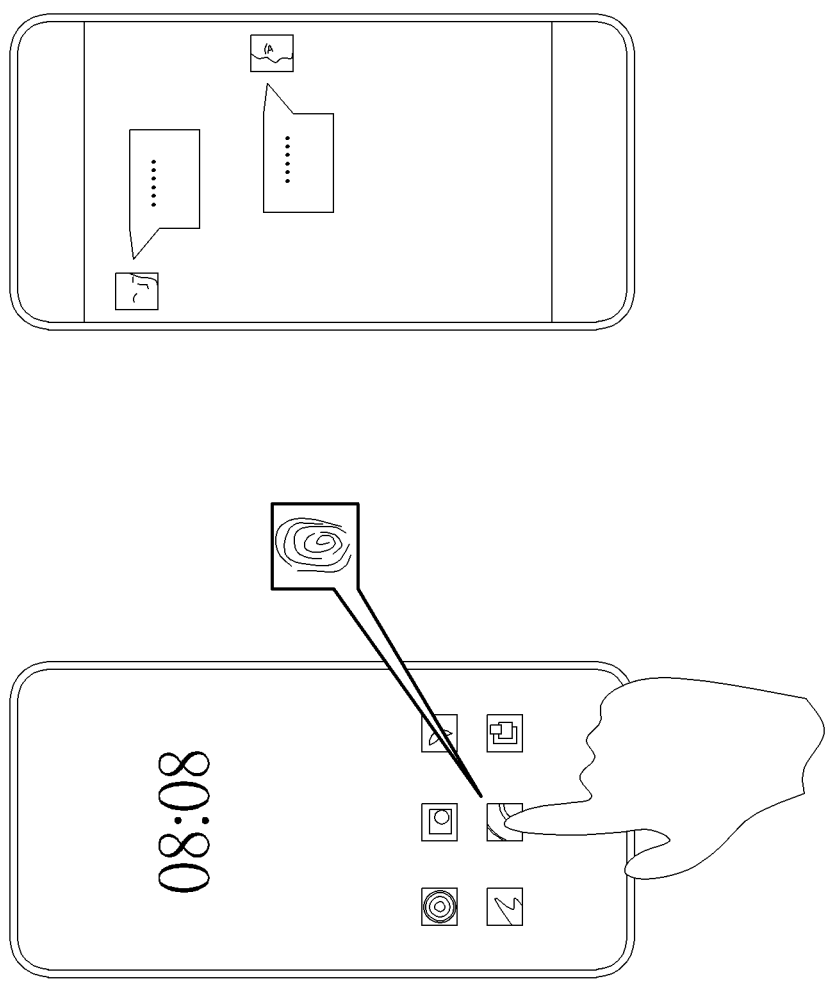
FIG. 2 is a schematic diagram of a method of opening an application based on fingerprint recognition according to an embodiment of the present invention.

Please refer to FIG. 2, which is a schematic diagram of a method of opening an application based on fingerprint recognition according to an embodiment of the present invention. As shown in FIG. 2, in order to open the application, the user may touch the icon of the application with a finger. As mentioned above, the optical fingerprint recognition scheme requires that the panel emits light at the touch region so as to sense the reflected light from the finger. Therefore, if the finger touch is detected, the touch sensing circuit of the FTDI circuit may notify the display driver circuit of the FTDI circuit, so that the display driver circuit may control the display panel to show an exposure icon and adjust the displayed image on the screen.

After the finger touch is detected, the fingerprint sensing circuit may start to perform fingerprint sensing on the touch region and receive the fingerprint image signals. The related image data are then forwarded to the system processor, and the system processor may perform matching and determine whether the received fingerprint image have a predetermined feature in the database. In this embodiment, the finger touch on the icon corresponding to an application is detected, and the application may be opened and the screen shows the corresponding user interface of the application if the fingerprint matching is successful. For example, the system processor may include a security module such as a trust zone, where the fingerprint matching may be performed to determine whether to open the application. In the trust zone, the information of fingerprint features of the registered fingerprint may be recorded. An algorithm is applied to determine whether the received fingerprint image matches with the recorded fingerprint features, so as to determine whether to open the application.

According to the embodiments of the present invention, in order to open the locked application, the user only needs to perform a specific touch gesture on the corresponding icon of the screen, and the fingerprint sensing operation may be performed on the touch position. This simplifies the fingerprint sensing flow to increase the sensing speed, so as to improve the user experience of fingerprint recognition.

Figure 3:
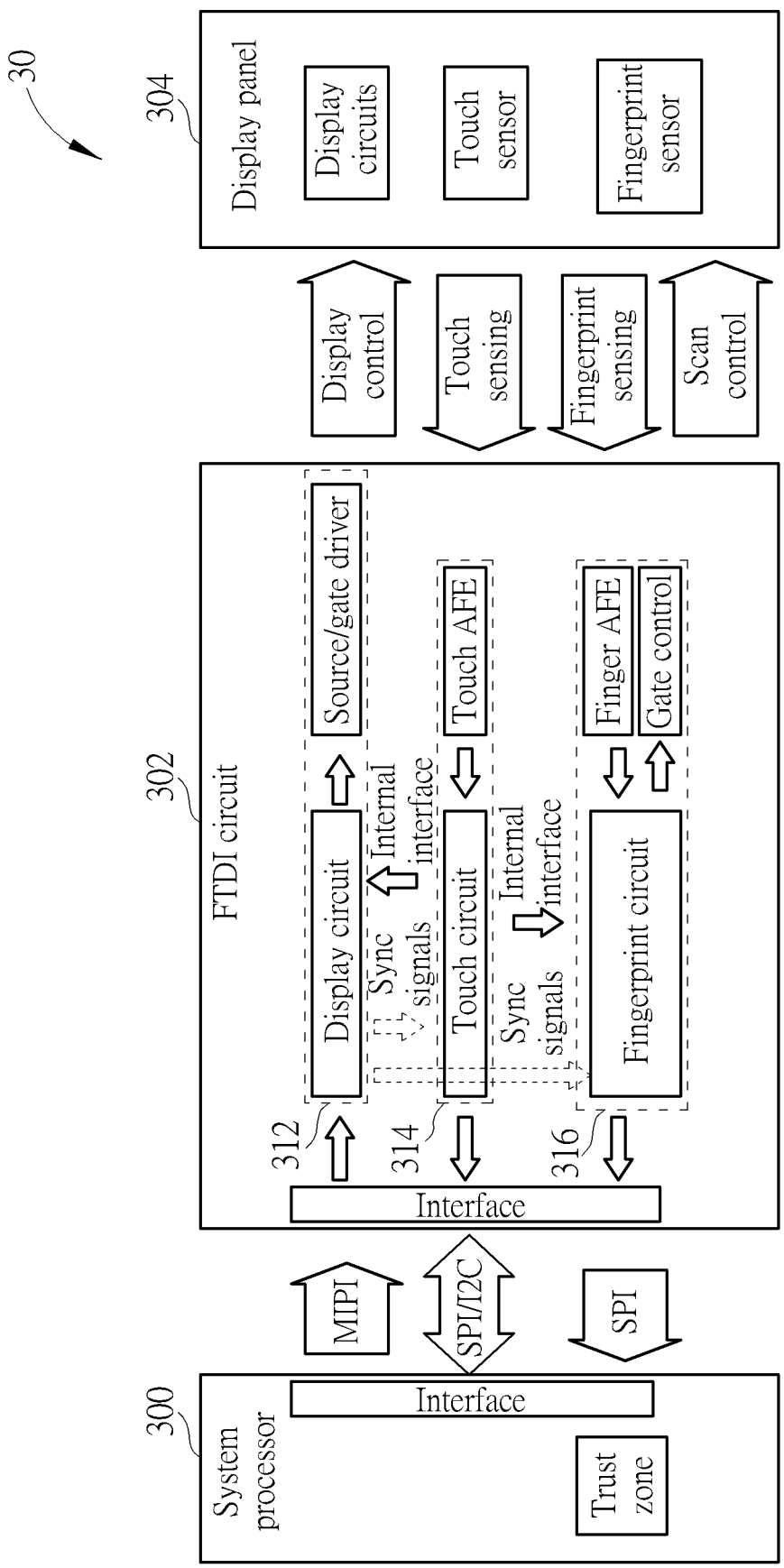
FIG. 3 is a schematic diagram of a fingerprint sensing system according to an embodiment of the present invention.

Please refer to FIG. 3, which is a schematic diagram of a fingerprint sensing system 30 according to an embodiment of the present invention. As shown in FIG. 3, the fingerprint sensing system 30 includes a system processor 300, an FTDI circuit 302, and a display panel 304. The system processor 300 may be a core processor of the electronic system, such as a central processing unit (CPU), a microcontroller unit (MCU), a microprocessor, and the like. As for a smart phone, the system processor 300 may be an MCU for controlling various applications and operations. The system processor 300 may include a security module such as a trust zone, where an algorithm is configured to perform fingerprint matching. Note that the algorithm for fingerprint recognition is usually quite complex, such that the fingerprint matching operation should be performed in the system processor 300 having larger computation resources and may not be implemented in the FTDI circuit 302. The FTDI circuit 302 aims at capturing or extracting the fingerprint image from the display panel 304, and processing the received fingerprint signals to amplify and acquire the desired image data.

The FTDI circuit 302 may be served as a control circuit for controlling the operations of the display panel 304. In an embodiment, the display panel 304 may be an in-cell touch and fingerprint panel, where the touch sensor and fingerprint sensor and their related wire connection circuits are disposed inside the display panel 304, e.g., disposed on the substrate of the display panel 304.

In order to realize the fingerprint sensing operation for opening the application, the FTDI circuit 302 includes a display driver circuit 312, a touch sensing circuit 314 and a fingerprint sensing circuit 316. The display driver circuit 312 is configured to control the display panel 304 to emit light and show the corresponding exposure icon. The touch sensing circuit 314 is configured to detect a finger touch on the display panel 304 and determine the position of the display panel 304 where the finger touch is detected. The fingerprint sensing circuit 316 is configured to perform fingerprint sensing on any position(s) of the display panel 304 and receive the fingerprint image signals correspondingly, in order to open the locked application.

In detail, the display driver circuit 312 may communicate with the system processor 300 through a mobile industry processor interface (MIPI). During the normal display process, the display driver circuit 312 may receive image data from the system processor 300 through the MIPI, and output the voltage signals of image data to the display panel 304. The display driver circuit 312 may include source and gate drivers for outputting the voltage signals and related control signals to the display circuits of the display panel 304, in order to realize the display control. The display driver circuit 312 is also capable of controlling the backlight intensity to facilitate the exposure for fingerprint sensing and controlling the display panel 304 to show the exposure icon.

The touch sensing circuit 314 may realize the touch sensing functions, to detect the finger touch on the display panel 304. The touch sensing circuit 314 may include a touch MCU for controlling the touch sensing operations. The touch MCU may communicate with the system processor 300 through a serial peripheral interface (SPI) or an inter-integrated circuit (I2C) interface. The touch sensing circuit 314 may also include a touch analog front-end (AFE) circuit, which is configured to output touch driving signals to the display panel 304 and correspondingly receive touch sensing signals from the touch sensor of the display panel 304. In an embodiment, the touch sensing circuit 314 may determine that a specific touch gesture appears on a specific position or zone of the display panel 304, and thereby notify the display driver circuit 312 to show the exposure icon at the position or zone and notify the fingerprint sensing circuit 316 to perform fingerprint sensing on the position or zone. Upon receiving the notifications from the touch sensing circuit 314, the display driver circuit 312 may control the display panel 304 to show the exposure icon, to indicate the position of the touch finger.

The fingerprint sensing circuit 316 is configured to perform the fingerprint sensing functions, to scan the fingerprint sensor and receive the fingerprint image signals from the display panel 304. In detail, the fingerprint sensing circuit 316 may include a gate control circuit for transmitting control signals to the fingerprint sensor to perform scanning, and include a fingerprint AFE circuit for receiving the fingerprint image signals correspondingly. The fingerprint sensing circuit 316 may also include a fingerprint readout circuit, which is capable of amplifying the peak and valley information in the received fingerprint image signals and filtering out unwanted noises and interferences. The fingerprint readout circuit may communicate with the system processor 300 through an SPI. In such a situation, the peak and valley information in the fingerprint image may be sent to the system processor 300, allowing the system processor 300 to perform fingerprint matching and recognition in a security module, e.g., the trust zone. In an embodiment, the fingerprint sensing circuit 316 is capable of selectively scanning specific zone(s) of the display panel 304 to receive the fingerprint image signals, where the zone(s) may correspond to the position where the specific touch gesture is detected.

Please keep referring to FIG. 3. In the FTDI circuit 302, the touch sensing circuit 314 may be coupled to the display driver circuit 312 and the fingerprint sensing circuit 316, and communication is perform therebetween. In general, in order to control the display panel 304 with in-cell touch and fingerprint sensors, the display control, touch control and fingerprint control should be performed based on time division. In such a situation, the display driver circuit 312 may send a synchronization signal or an internal clock to the touch sensing circuit 314 and the fingerprint sensing circuit 316, to synchronize the display control, touch sensing and fingerprint sensing operations. An internal interface is also disposed between the touch sensing circuit 314 and each of the display driver circuit 312 and the fingerprint sensing circuit 316, allowing the touch sensing circuit 314 to send the information of finger touch position to the display driver circuit 312 and the fingerprint sensing circuit 316, to realize the in-display fingerprint sensing. For example, the touch sensing circuit 314 may perform touch sensing to calculate the coordinate point of the touch position. The touch sensing circuit 314 then informs the display driver circuit 312 and the fingerprint sensing circuit 316 of the coordinate information; hence, the display driver circuit 312 may control the display panel 304 to show the exposure icon at the coordinate point of finger touch, and the fingerprint sensing circuit 316 may scan the zone(s) corresponding to the coordinate point to receive the fingerprint image.

Figure 4:
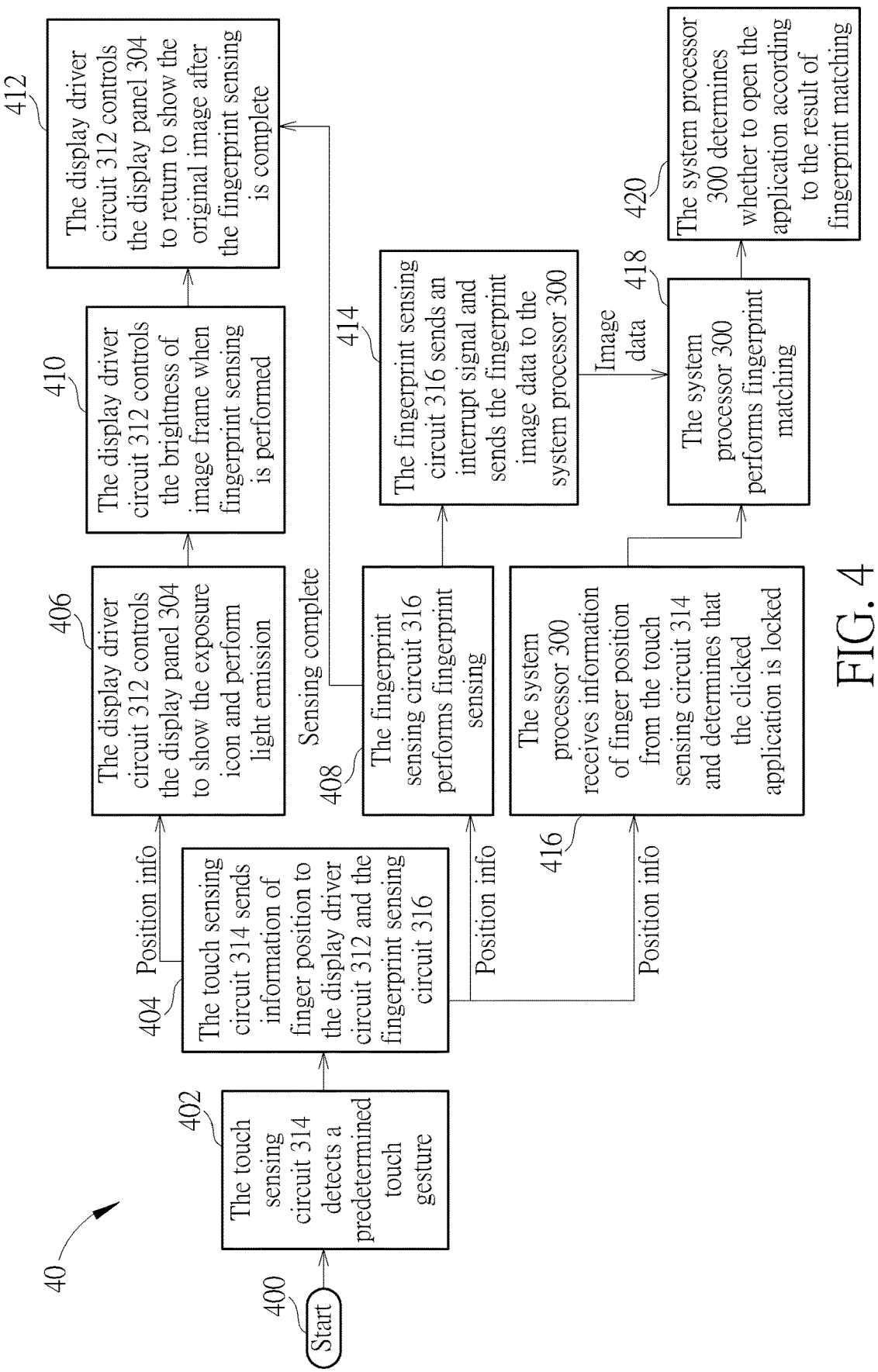
FIG. 4 is a flowchart of a fingerprint sensing process according to an embodiment of the present invention.

Please refer to FIG. 4, which is a flowchart of a fingerprint sensing process 40 according to an embodiment of the present invention. The fingerprint sensing process 40, which may be implemented in a control circuit for a panel such as the FTDI circuit 302 shown in FIG. 3, includes the following steps:

Step 400: Start.

Step 402: The touch sensing circuit 314 detects a predetermined touch gesture.

Step 404: The touch sensing circuit 314 sends information of finger position to the display driver circuit 312 and the fingerprint sensing circuit 316.

Step 406: The display driver circuit 312 controls the display panel 304 to show the exposure icon and perform light emission.

Step 408: The fingerprint sensing circuit 316 performs fingerprint sensing.

Step 410: The display driver circuit 312 controls the brightness of image frame when fingerprint sensing is performed.

Step 412: The display driver circuit 312 controls the display panel 304 to return to show the original image after the fingerprint sensing is complete.

Step 414: The fingerprint sensing circuit 316 sends an interrupt signal and sends the fingerprint image data to the system processor 300.

Step 416: The system processor 300 receives information of finger position from the touch sensing circuit 314 and determines that the clicked application is locked.

Step 418: The system processor 300 performs fingerprint matching.

Step 420: The system processor 300 determines whether to open the application according to the result of fingerprint matching.

In the beginning of the fingerprint sensing process 40, the display panel 304 is under normal display, and the touch sensing circuit 314 operates normally to scan the display panel 304 to perform touch reporting.

In order to prevent general touch sensing and reporting operations from being interfered with by the trigger of fingerprint recognition, the present invention applies a specific touch gesture to trigger the fingerprint recognition for the specific function. In an embodiment, the specific touch gesture may be a heavy touch gesture. That is, the user may perform a heavy touch on an icon, to open an application corresponding to the icon based on the fingerprint sensing result. The heavy touch gesture may be detected based on the characteristics of the touch sensing signals such as the touch strength and/or the touch range. For example, occurrence of a heavy touch gesture may be determined if the touch strength exceeds a level and/or the touch range exceeds a threshold. In another embodiment, the specific touch gesture may be a long touch gesture or any other possible touch gesture which is distinguishable to the general touch gesture.

Figure 5:
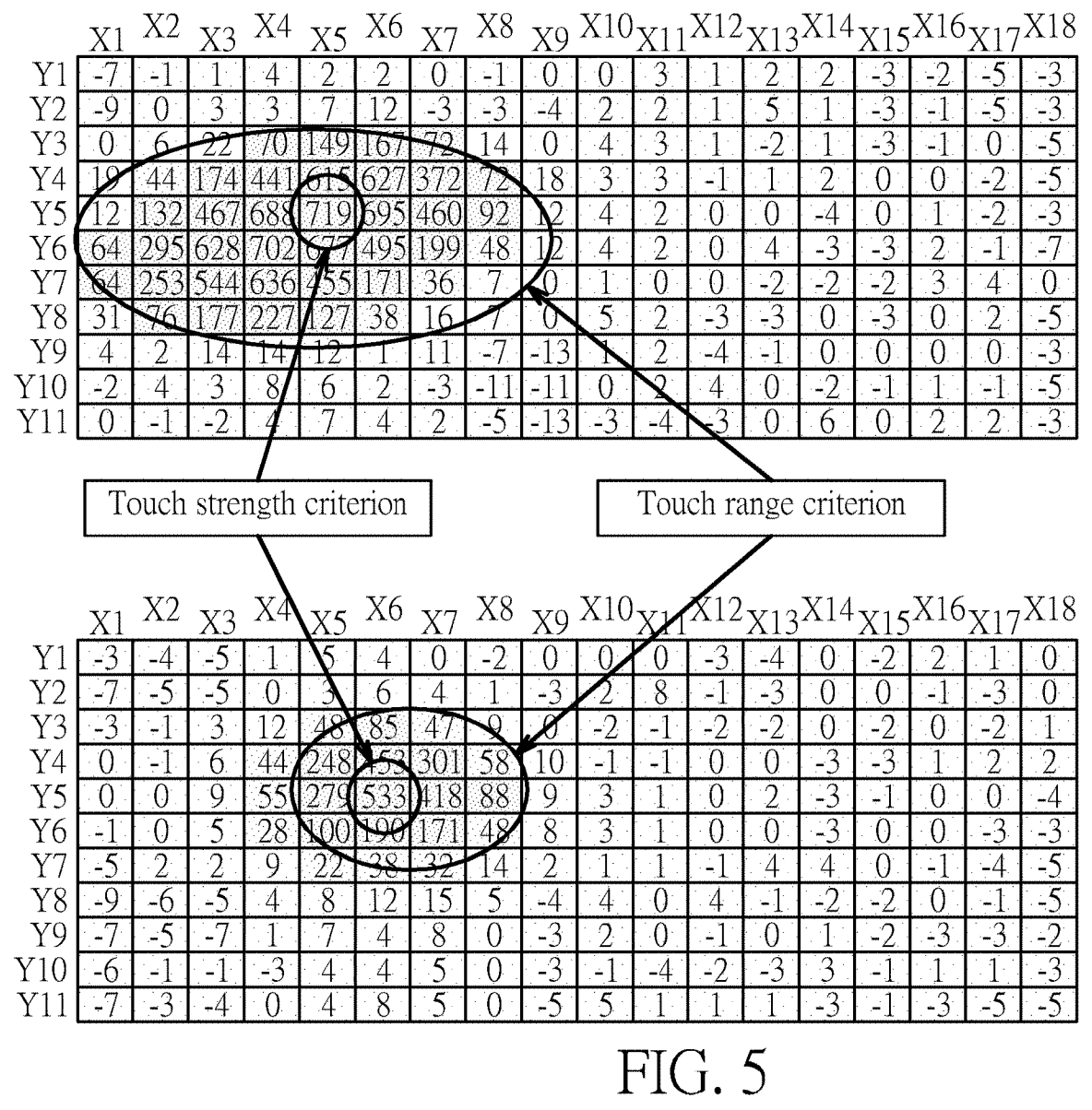

Please refer to FIG. 5, which is a schematic diagram of determining the heavy touch gesture based on the touch strength and/or touch range according to an embodiment of the present invention. FIG. 5 shows touch raw data with the values of touch sensing signals corresponding to the sensing elements of the display panel 304, where the sensing elements are spread through the display panel 304, as defined by the coordinates indicated by the x-axis value (X1-X18) and the y-axis value (Y1-Y11). There are two exemplary touch behaviors respectively representing a general touch gesture and a heavy touch gesture as shown in FIG. 5. In this embodiment, the signal value may be a touch magnitude sensed by the touch sensing element at each position, and a higher value stands for a higher touch sensing signal. For example, as for a capacitive touch sensor, the signal value may be a capacitance value received from each position. In FIG. 5, the upper half part illustrates a heavy touch, where the touch range occupies a larger region and the maximum touch signal is up to 719; and the lower half part illustrates a general touch, where the touch range occupies a smaller region and the maximum touch signal is 533. If the touch strength is applied as a criterion for determining the heavy touch, a threshold may be configured between 533 and 719 to differentiate these two touch behaviors. If the touch range is applied as a criterion for determining the heavy touch, the range or area where higher touch sensing signals appear may be considered. In an embodiment, the firmware may include an algorithm that is capable of determining the heavy touch based on combination of the touch strength and touch range criteria. By analyzing the touch strength and touch range, each touch event may be determined to be a normal touch or a heavy touch. The self-fingerprint sensing operation of the FTDI circuit 302 is triggered only if the heavy touch appears.

In an embodiment, the thresholds of touch strength and/or touch range for determining the heavy touch may be dynamically adjusted, allowing the heavy touch detection to be more adaptive to user preference. The heavy touch detection function may also be disabled, to disable the self-fingerprint sensing function of the FTDI circuit 302. In other words, if the function of heavy touch detection is turned off, the self-fingerprint sensing function may not be triggered.

According to the fingerprint sensing process 40, when the touch sensing circuit 314 detects the predetermined touch gesture such as the heavy touch gesture on the display panel 304, the touch sensing circuit 314 may know the position of the display panel 304 on which the predetermined touch gesture is detected. The predetermined touch gesture may be a heavy touch gesture, a long touch gesture, or any other touch gesture recognizable by the fingerprint sensing system 30.

Subsequently, the touch sensing circuit 314 may send the information associated with the position of touch finger to the display driver circuit 312 and the fingerprint sensing circuit 316. Please refer to FIG. 6, which is a schematic diagram of information associated with the position of touch finger for the display driver circuit 312 and the fingerprint sensing circuit 316. As mentioned above, in order to realize the optical fingerprint sensing scheme, the display panel 304 should emit light and show the corresponding exposure icon at the touch region. Therefore, the touch sensing circuit 314 may send the information of touch position to the display driver circuit 312, allowing the display driver circuit 312 to control the display panel 304 to emit light and correspondingly show the exposure icon at the position where the predetermined touch gesture such as heavy touch or long touch is detected.

Please note that the exposure icon appears from the normal display period where the image data is sent from the system processor; hence, the display driver circuit 312 may insert the exposure icon into the original display data to be shown on the position where the finger touch (i.e., heavy touch gesture) is detected. This may be realized by replacing the original display data with the image data of exposure icon at the touch position. In such a situation, the system processor 300 may not need to send additional image data to the FTDI circuit 302.

In order to achieve better fingerprint sensing image, the backlight intensity should be increased to improve the exposure performance. Therefore, the display driver circuit 312 should be able to control the backlight unit of the display panel 304, so as to control the brightness of the displayed image frame. For example, during the fingerprint sensing process, the display driver circuit 312 may control the backlight to increase to the maximum intensity to facilitate the exposure, and the exposure icon is shown on the exposure area. Meanwhile, the brightness at regions other than the exposure area on the screen may also increase due to the increased backlight intensity. In such a situation, the image data of this image frame except for those corresponding to the exposure icon may be adjusted to be adapted to the increased backlight intensity. In detail, the gray scale of these image data may be decreased by a specific level in order to cancel the influence of increased backlight intensity, so that the brightness sensed by the viewer may be invariant. In another embodiment, if the direct backlight is applied in the display panel 304, the backlight intensity at the exposure area may be increased by using the local dimming technique without influencing the brightness at other regions.

Figure 7:
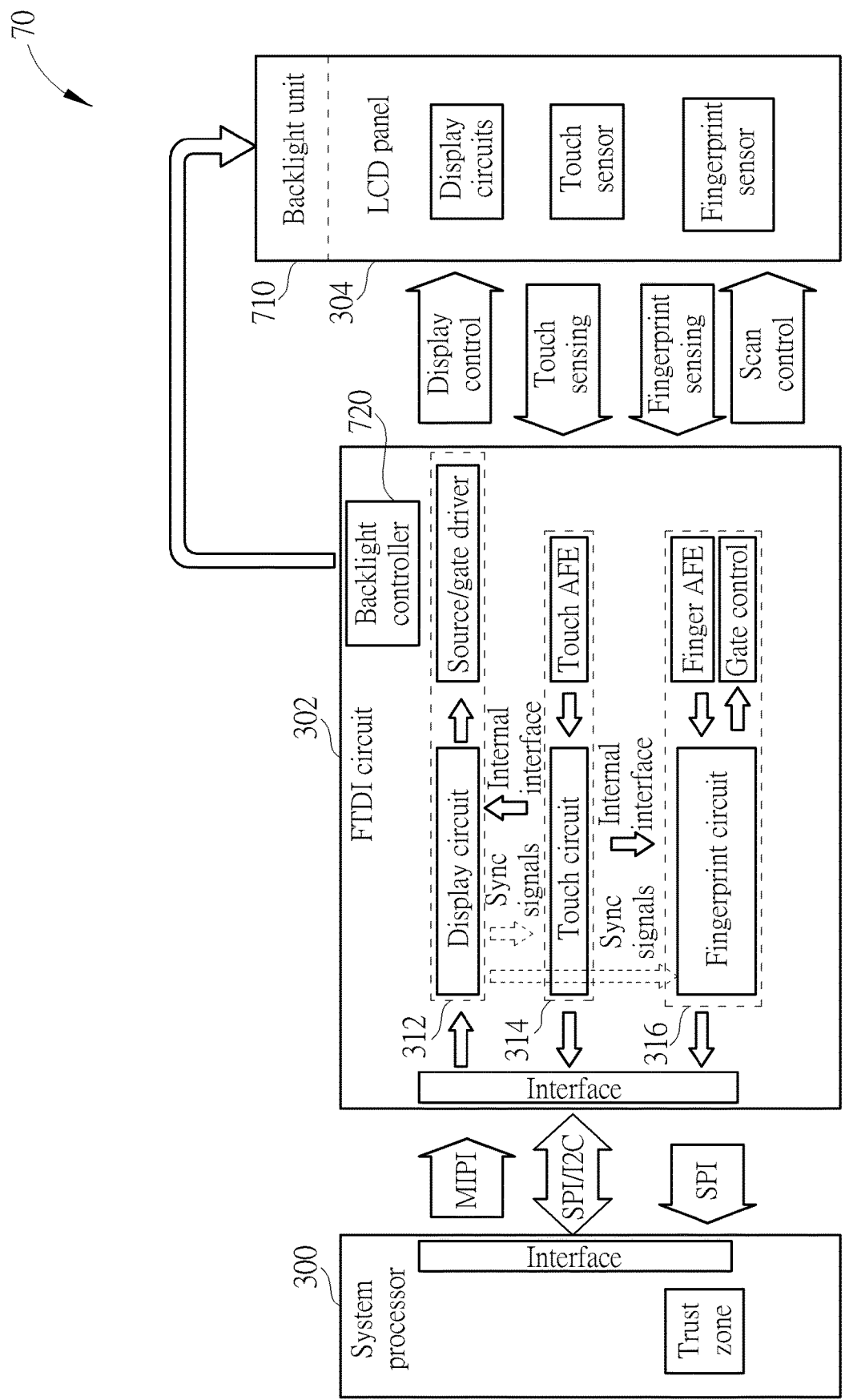
FIG. 7 is a schematic diagram of a fingerprint sensing system with backlight control.

Please note that the above backlight control operation may be realized in an LCD panel. In an embodiment, the FTDI circuit 302 may include a backlight controller for performing backlight control. Please refer to FIG. 7, which is a schematic diagram of a fingerprint sensing system 70 with backlight control. As shown in FIG. 7, the display panel 304 may be an LCD panel having a backlight unit 710, where the display operation is performed by turning on the backlight unit 710. Also, the display driver circuit 312 may further include a backlight controller 720, which is configured to control the backlight unit 710 to emit light and also control the emitted light intensity. Note that in a conventional LCD panel, the display operations are controlled by the system processor, and thus the related backlight unit is also controlled by the system processor. In comparison, in the fingerprint sensing system 70 of the present invention, the backlight unit 710 may also be controlled by the backlight controller 720 of the FTDI circuit 302, and thus the display operations may be realized without intervention of the system processor 300.

Figure 6:
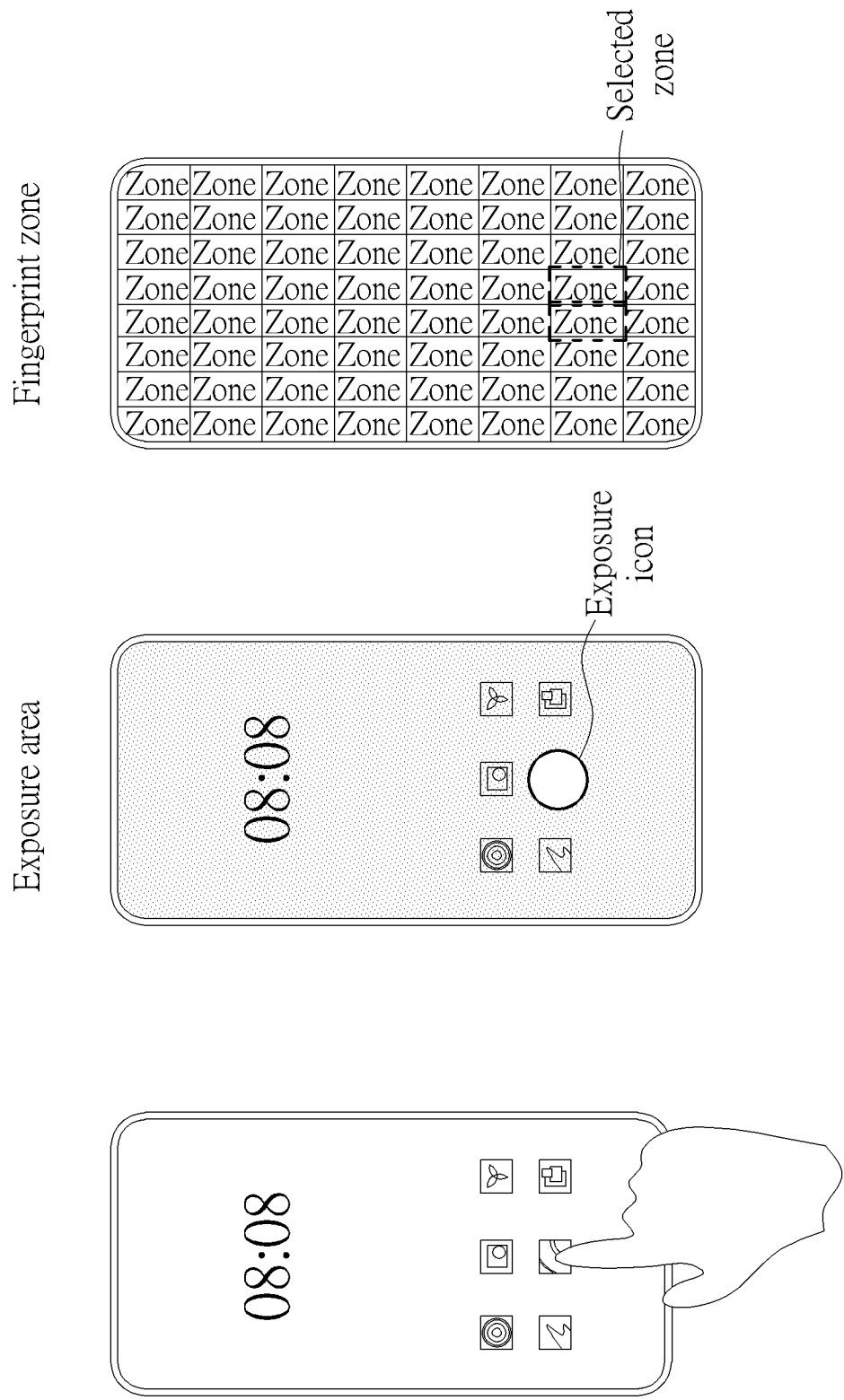
FIG. 6 is a schematic diagram of information associated with the position of touch finger for the display driver circuit and the fingerprint sensing circuit.

On the other hand, the information associated with touch position should also be sent to the fingerprint sensing circuit 316 to facilitate the fingerprint sensing operations. In general, the fingerprint sensor on the display panel 304 may be separated into a plurality of zones, and the fingerprint scan may be performed in one or several zones based on the touch position of the finger, as shown in FIG. 6. In an embodiment, the touch sensing circuit 314 may determine the position and corresponding zone(s) of the display panel 304 on which the heavy touch is detected, and send the related information to the fingerprint sensing circuit 316; hence, the fingerprint sensing circuit 316 may perform fingerprint sensing on the zone(s) and receive the fingerprint image signals from the zone(s) correspondingly. In such a situation, the fingerprint sensing may not need to be performed on the entire screen. Instead, the fingerprint sensing is performed only on the zone(s) corresponding to the position on which the heavy touch is detected, and the fingerprint image signals are only received from the zone(s) determined or selected based on the finger's position. This reduces the time consumption and computation resources for fingerprint recognition and matching, and thus the fingerprint recognition speed may be improved.

After the fingerprint sensing is complete and the fingerprint image signals are received, the fingerprint sensing circuit 316 may notify the display driver circuit 312 to recover the original image. Therefore, the display driver circuit 312 may control the display panel 304 to recover the original backlight intensity to return to perform the normal display operation and show the original image. The fingerprint sensing circuit 316 may also send an interrupt signal to the system processor 300 to notify the system processor 300 to start to perform fingerprint matching, and then output the image data corresponding to the received fingerprint image signals to the system processor 300. For example, an interrupt pin is connected between the system processor 300 and the FTDI circuit 302, and the interrupt signal may be sent via the interrupt pin. Alternatively, the interrupt signal may be included in a packet transmitted through the SPI interface disposed between the system processor 300 and the fingerprint sensing circuit 316.

Upon receiving the image data, the system processor 300 may perform fingerprint matching to determine whether to perform the specific function. If the heavy touch is received on the position of an icon in the user interface, the specific function may be opening the application corresponding to the icon. In an embodiment, the touch sensing circuit 314 may inform the system processor 300 of the position on which the heavy touch is detected; hence, the system processor 300 may know that this touch position has an icon of an application and also determine that the selected application is locked. In such a situation, the system processor 300 may perform fingerprint matching, to determine whether to open the application according to the fingerprint matching result. In an embodiment, the system processor 300 may include a trust zone configured to perform fingerprint matching. If the matching is successful (e.g., the matching indicates that the received fingerprint image has a specific feature), the system processor 300 may open the application and control the display panel 304 to show an image of the application. As a result, the system processor 300 may start to deal with the fingerprint recognition functions after the interrupt signal is received. Before the fingerprint sensing operation is complete, the system processor 300 may not be involved in the fingerprint sensing operation, and thus tedious communications between the system processor and the FTDI circuit in the conventional fingerprint sensing method may be omitted.

In another embodiment, the fingerprint recognition may not be performed successfully and/or the fingerprint matching may indicate a wrong matching result. In such a situation, the system processor 300 may notify the FTDI circuit 302 that the fingerprint matching is failed, or the FTDI circuit 302 may wait for a period of time but no confirmation message from the system processor 300 is received; hence, the application may not be opened successfully, and the FTDI circuit 302 may stop the fingerprint sensing process and control the display panel 304 to return to the normal display mode, e.g., show the original image, and recover the backlight intensity. Meanwhile, a message or diagram indicating the failed fingerprint recognition may also be shown on the display panel 304. Note that the touch sensing circuit 314 is still operating to detect the finger touch (or heavy touch) during the fingerprint recognition process. In an embodiment, if the touch sensing circuit 314 detects that the touch finger is removed from the display panel 304 during the self-fingerprint sensing process, the fingerprint sensing operation may be interrupted. At this moment, the display driver circuit 312 may stop displaying the exposure icon and control the display panel 304 to return to the normal display mode and recover the backlight intensity. This touch detection operation during the fingerprint sensing process may prevent unnecessary fingerprint sensing operation after the finger is removed.

Please note that the present invention aims at providing a fingerprint sensing method for a display panel and an FTDI circuit without intervention of the system processor. Those skilled in the art may make modifications and alternations accordingly. For example, in the embodiments of the present invention, the display driver circuit may control the panel to show an exposure icon at the finger touch position, to generate light emission for optical fingerprint sensing, as shown in FIG. 6. Note that the exposure icon may not be limited to that illustrated in this disclosure. For example, the exposure icon may be of any shape such as a circle or a square, and/or the exposure icon may be shown with any feasible color or combination of several colors, as long as the exposure icon and the corresponding light emission may cover the fingerprint sensing area. Note that the displayed color is associated with the wavelength of emitted light, and the wavelength may influence the sensing result of the fingerprint image. Further, due to different panel characteristics, the same display data may generate different colors on different panels; hence, it is preferable to apply a flexible exposure icon, where the appearance such as color, size, and/or shape of the exposure icon may be configurable or programmable by a user.

In addition, in the above embodiments, the fingerprint sensing operation is triggered for opening the application, but the present invention is not limited thereto. In another embodiment, the fingerprint sensing operation may be performed to realize any possible function in the electronic device that requires identity recognition, such as opening a specific user interface, triggering a payment, logging in an identity, or entering a locked webpage. As long as the function should be enabled based on the result of fingerprint recognition and matching, the fingerprint sensing method of the present invention is feasible.

Further, in the above embodiments, the FTDI circuit is configured to control an LCD panel and thus a backlight controller may be applied. In another embodiment, the FTDI circuit may be configured to control an organic light-emitting diode (OLED) panel; hence, the light emission for fingerprint sensing may be controlled by driving OLEDs in the display pixels, and the circuit structure of the FTDI circuit 302 shown in FIG. 3 without the backlight controller may be feasible. Note that the fingerprint sensing method of the present invention is applicable to any type of display panel, which should not be a limitation on the scope of the present invention. Further, in the embodiments of the present invention, fingerprint sensing may be performed without control and command of the system processor, where the fingerprint sensing scheme may not be limited to optical fingerprint sensing as illustrated in this disclosure. Other type of fingerprint sensing such as ultrasonic fingerprint sensing may also be feasible.

In the above embodiment, the heavy touch gesture is determined based on the received touch sensing signals, where the touch strength and/or touch range may be applied as criteria for determining the heavy touch. In another embodiment, the display panel 304 may be implemented with a force touch sensor, which has the capability of sensing the heavy touch gesture. The force touch sensor may be a layer or several layers of sensor array disposed below the display module. The force touch sensor may sense the pressure exerted on the screen, and the heavy touch gesture may be determined based on the pressure information.

Figure 8:
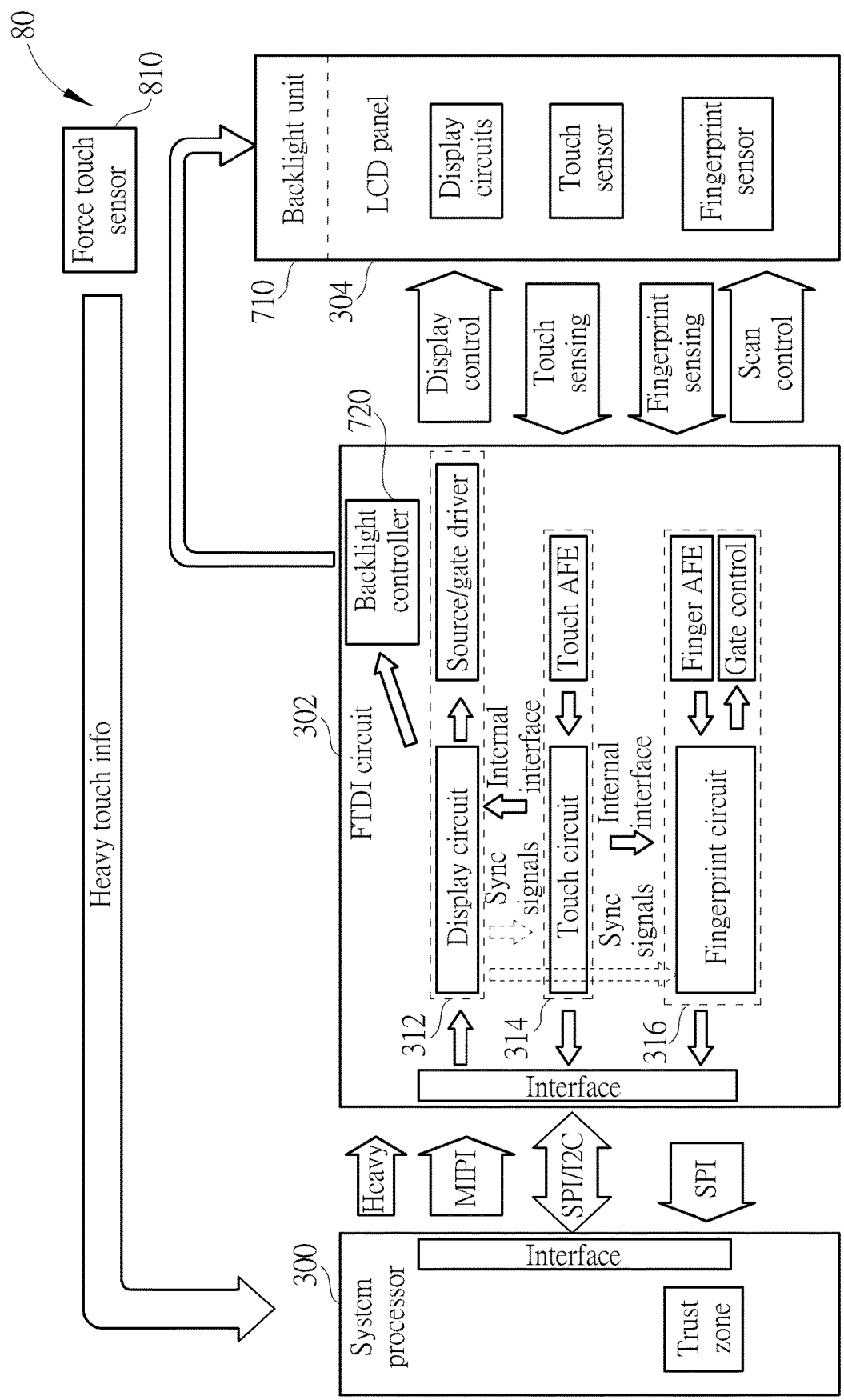
FIG. 8 is a schematic diagram of a fingerprint sensing system having a force touch sensor according to an embodiment of the present invention.

Please refer to FIG. 8, which is a schematic diagram of a fingerprint sensing system 80 having a force touch sensor according to an embodiment of the present invention. The circuit structure of the fingerprint sensing system 80 is similar to the circuit structure of the fingerprint sensing system 70 shown in FIG. 7, so signals and elements having similar functions are denoted by the same symbols. As shown in FIG. 8, the difference between the fingerprint sensing system 80 and the fingerprint sensing system 70 is that, the fingerprint sensing system 80 further includes a force touch sensor 810. The self-fingerprint sensing method is triggered when the force touch sensor 810 detects a heavy touch gesture. In this embodiment, the force touch sensor 810 is coupled to the system processor 300, and information related to heavy touch sensing is sent to the system processor 300, and the system processor 300 may process this sensing information to perform heavy touch detection. When the system processor 300 determines that a heavy touch appears based on the received sensing information, the system processor 300 may send a force indication signal to the FTDI circuit 302. Upon receiving the force indication signal, the FTDI circuit 302 may start to perform the self-fingerprint sensing process as mentioned above.

Figure 9:
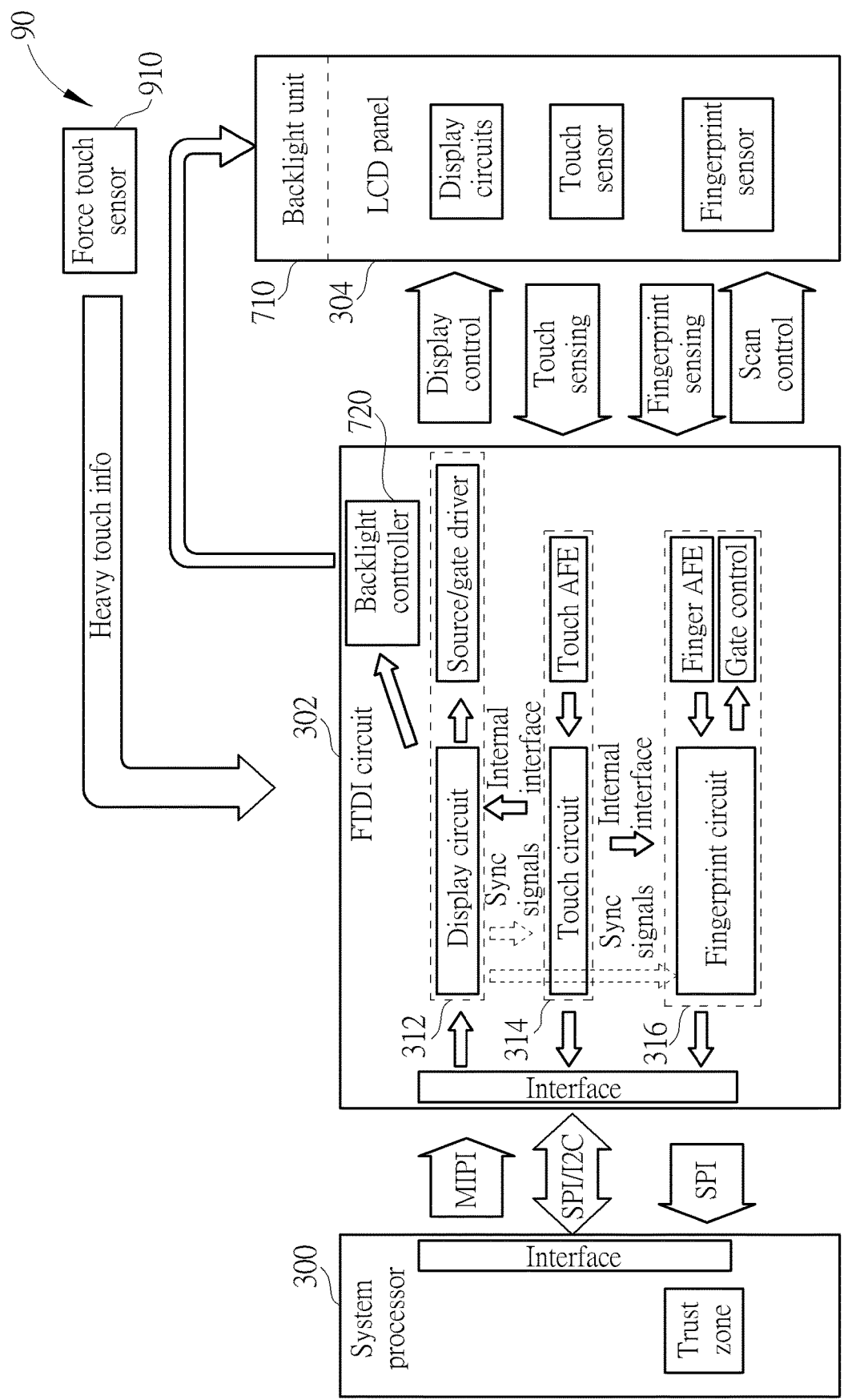
FIG. 9 is a schematic diagram of another fingerprint sensing system having a force touch sensor according to an embodiment of the present invention.

FIG. 9 illustrates another fingerprint sensing system 90, where the force touch sensor 910 is coupled to the FTDI circuit 320. In such a situation, the FTDI circuit 320 may directly receive and process the information related to heavy touch sensing from the force touch sensor 910; hence, the fingerprint sensing operation may be activated without intervention of the system processor 300.

Figure 10A:
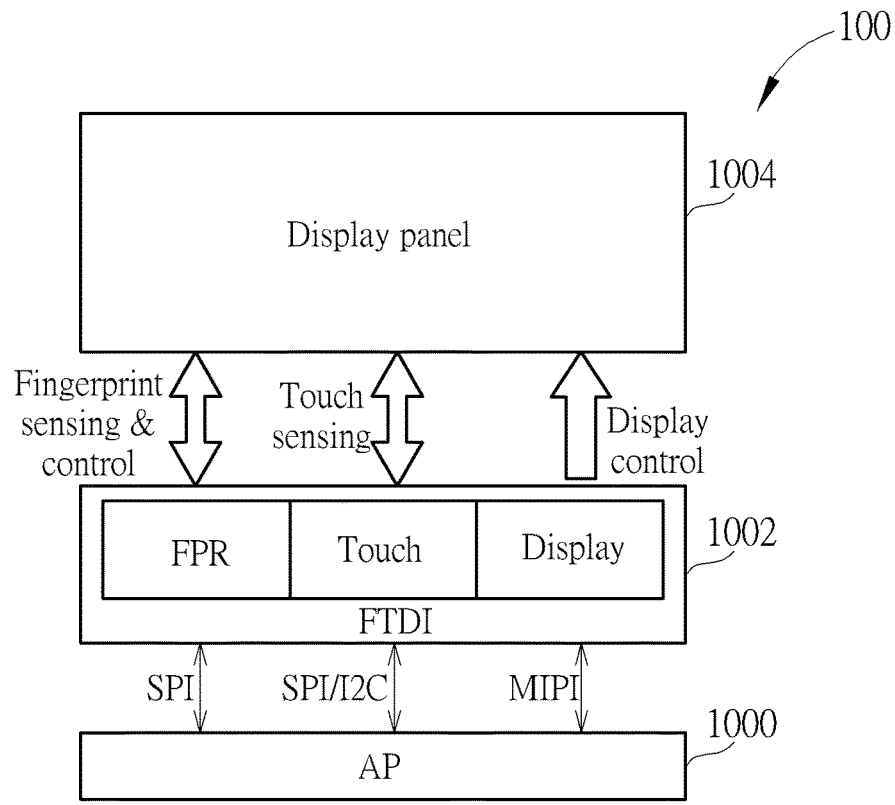
FIG. 10A is a schematic diagram of a fingerprint sensing system according to an embodiment of the present invention.

Please refer to FIG. 10A, which is a schematic diagram of a fingerprint sensing system 100 according to an embodiment of the present invention. As shown in FIG. 10A, the fingerprint sensing system 100 includes a system processor (AP) 1000, an FTDI circuit 1002, and a display panel 1004, where the FTDI circuit 1002 may be a single chip integrated with the processing circuits for display, touch and fingerprint functions. The related operations and interface controls of the FTDI circuit 1002 are similar to those of the FTDI circuit 302 shown in FIG. 3, and will not be narrated herein.

Figure 10B:
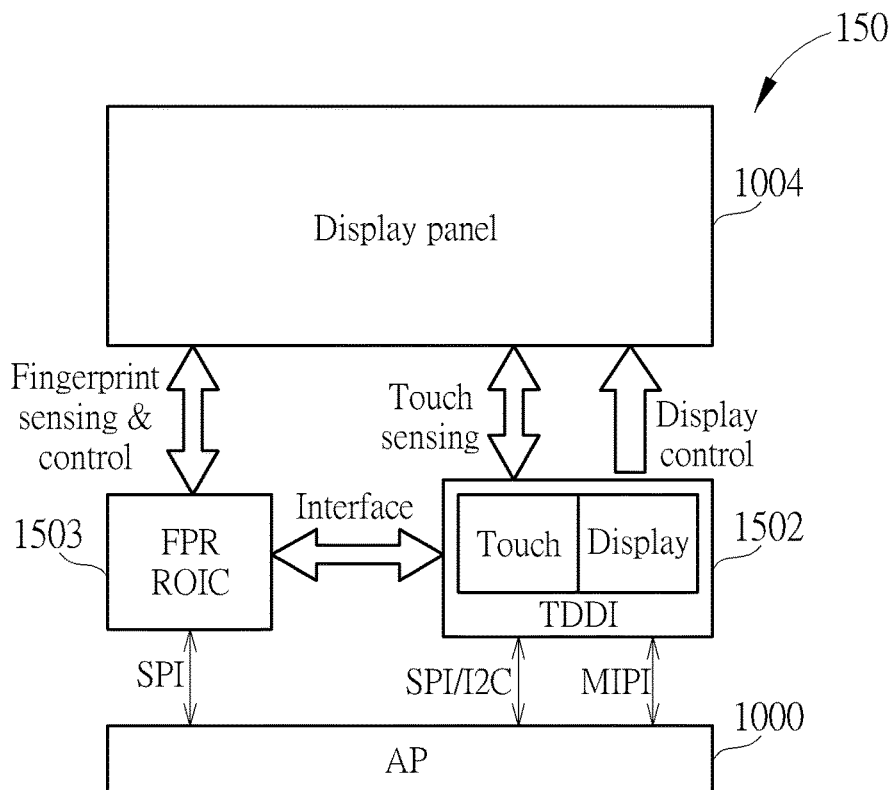
FIG. 10B is a schematic diagram of another fingerprint sensing system according to an embodiment of the present invention.

In another embodiment, the single-chip FTDI circuit may be replaced by a multiple-chip implementation. Please refer to FIG. 10B, which is a schematic diagram of another fingerprint sensing system 150 according to an embodiment of the present invention. As shown in FIG. 10B, the fingerprint sensing system 150 is different from the fingerprint sensing system 100 in that, the fingerprint sensing system 150 includes a touch and display driving integration (TDDI) circuit 1502 and a fingerprint readout integrated circuit (FPR ROIC) 1503, which replace the functions of the FTDI circuit 1002 in the fingerprint sensing system 100. An interface is disposed between the TDDI circuit 1502 and the FPR ROIC 1503, for forwarding necessary messages such as the synchronization signal for synchronizing the display driving, touch sensing and fingerprint sensing functions and the information related to finger touch position and related fingerprint sensing zone(s).

To sum up, the present invention provides a control circuit for controlling the display panel to realize a specific function based on fingerprint recognition. The control circuit may be an FTDI circuit implemented as a single chip, or a two-chip structure with combination of a TDDI circuit and a fingerprint ROIC. If a user needs to open a locked application, the user may perform heavy touch on an icon corresponding to the application shown on the panel. The heavy touch gesture may be determined by analyzing the touch strength and/or range of the touch sensing signals, or determined through a force touch sensor. When receiving the heavy touch gesture, the FTDI circuit may start the self-fingerprint sensing operation, where the display driver circuit of the FTDI circuit may control the display panel to show an exposure icon and correspondingly adjust the backlight intensity and related image data, and the fingerprint sensing circuit of the FTDI circuit may start fingerprint sensing at the position where heavy touch is detected. The fingerprint sensing operations may be performed without intervention of the system processor, and thus back and forth communication between the FTDI circuit and the system processor may be omitted. The FTDI circuit may notify the system processor after the fingerprint sensing is complete, allowing the system processor to perform fingerprint recognition and matching. The application may be opened if the fingerprint matching is successful. The fingerprint sensing method of the present invention can increase the speed of fingerprint recognition, so as to achieve better user experience of fingerprint recognition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit, configured to control a display panel under normal display, the control circuit comprising:
   a display driver circuit, configured to control the display panel to show an exposure icon;
   a touch sensing circuit, coupled to the display driver circuit, configured to detect a predetermined touch gesture on the display panel and determine a position of the display panel on which the predetermined touch gesture is detected; and
   a fingerprint sensing circuit, coupled to the touch sensing circuit, configured to perform fingerprint sensing on at least one zone covering the position where the predetermined touch gesture is detected, in order to perform a specific function;
   wherein the exposure icon indicates the position on which the predetermined touch gesture is detected;
   wherein when the fingerprint sensing is performed, the display driver circuit is further configured to control a brightness of an image frame by performing the following steps:
      controlling a backlight intensity of the display panel to increase when the fingerprint sensing is performed; and
      adjusting image data of the image frame except for image data corresponding to the exposure icon, allowing the image frame to be adapted to the increased backlight intensity.

2. The control circuit of claim 1, wherein an icon corresponding to an application is shown on the position, and the specific function comprises opening the application.

3. The control circuit of claim 1, wherein the fingerprint sensing circuit is further configured to output image data corresponding to fingerprint image signals received from the display panel to a system processor, allowing the system processor to determine whether to perform the specific function.

4. The control circuit of claim 3, wherein the control circuit is configured to output an interrupt signal to the system processor when the fingerprint image signals are received.

5. The control circuit of claim 1, wherein the predetermined touch gesture is a heavy touch gesture or a long touch gesture.

6. The control circuit of claim 5, wherein the touch sensing circuit is configured to detect the heavy touch gesture by receiving sensing information from a force touch sensor.

7. The control circuit of claim 5, wherein the touch sensing circuit is configured to detect the heavy touch gesture according to at least one of a touch strength and a touch range based on touch sensing signals received by the touch sensing circuit.

8. A method of a control circuit, for controlling a display panel under normal display, the method comprising:
    detecting a predetermined touch gesture on the display panel;
    determining a position of the display panel on which the predetermined touch gesture is detected;
    performing fingerprint sensing on at least one zone covering the position where the predetermined touch gesture is detected, in order to perform a specific function;
    controlling the display panel to show an exposure icon, wherein the exposure icon indicates the position on which the predetermined touch gesture is detected; and
    controlling a brightness of an image frame when the fingerprint sensing is performed;
    wherein the step of controlling the brightness of the image frame when the fingerprint sensing is performed comprises:
        controlling a backlight intensity of the display panel to increase when the fingerprint sensing is performed; and
        adjusting image data of the image frame except for image data corresponding to the exposure icon, allowing the image frame to be adapted to the increased backlight intensity.

9. The method of claim 8, wherein an icon corresponding to an application is shown on the position, and the specific function comprises opening the application.

10. The method of claim 8, further comprising:
    outputting image data corresponding to fingerprint image signals received from the display panel to a system processor, allowing the system processor to determine whether to perform the specific function.

11. The method of claim 10, further comprising:
    outputting an interrupt signal to the system processor when the fingerprint image signals are received.

12. The method of claim 8, wherein the predetermined touch gesture is a heavy touch gesture or a long touch gesture.

13. The method of claim 12, wherein the step of detecting the predetermined touch gesture on the display panel comprises:
    detecting the heavy touch gesture by receiving sensing information from a force touch sensor.

14. The method of claim 12, wherein the step of detecting the predetermined touch gesture on the display panel comprises:
    detecting the heavy touch gesture according to at least one of a touch strength and a touch range based on received touch sensing signals.

* * * * *